United States Patent
Baker

[45] Sept. 26, 1972
[11] 3,693,515

[54] OPTICAL REFLECTOR SYSTEM
[72] Inventor: Charles W. Baker, Cedar Grove, N.J.
[73] Assignee: Vari-typer Corporation, Hanover, N.J.
[22] Filed: April 30, 1971
[21] Appl. No.: 139,112

[52] U.S. Cl.................95/4.5 R, 352/203, 353/38
[51] Int. Cl..................B41b 21/08, B41b 21/12
[58] Field of Search.............95/4.5; 352/198, 203; 350/96 T, 4; 353/38, 20; 240/41.3, 41.4, 106, 106.1

[56] References Cited

UNITED STATES PATENTS

| | | |
|---|---|---|
| 3,368,198 | 2/1968 | Eikenberry et al........340/378 X |
| 3,484,599 | 12/1969 | Little........................240/41.3 |
| 2,764,071 | 9/1956 | Huebner...................95/4.5 R |
| 3,064,545 | 11/1962 | Scantlin....................95/4.5 R |
| 1,577,388 | 3/1926 | Twyman...................350/96 T |
| 3,543,657 | 12/1970 | Rosenblum...............95/4.5 R |
| 3,509,804 | 5/1970 | Kohler et al. ............95/4.5 R |

Primary Examiner—Robert P. Greiner
Attorney—Russell L. Root and Ray S. Pyle

[57] ABSTRACT

An optical reflector system is disclosed utilizing a plurality of reflecting surfaces forming a diverging tunnel to project a substantially uniform intensity on an optical surface spaced from the reflector system. The invention is suitable for use with optical projection systems and is able to compensate for the effects of other optical components within the projection system. The reflector system is applicable to high speed character projection as used in the photo-composition and photo-type setting arts.

25 Claims, 10 Drawing Figures

PATENTED SEP 26 1972

CHARLES W. BAKER
INVENTOR
BY Ray S Pyle
ATTORNEY

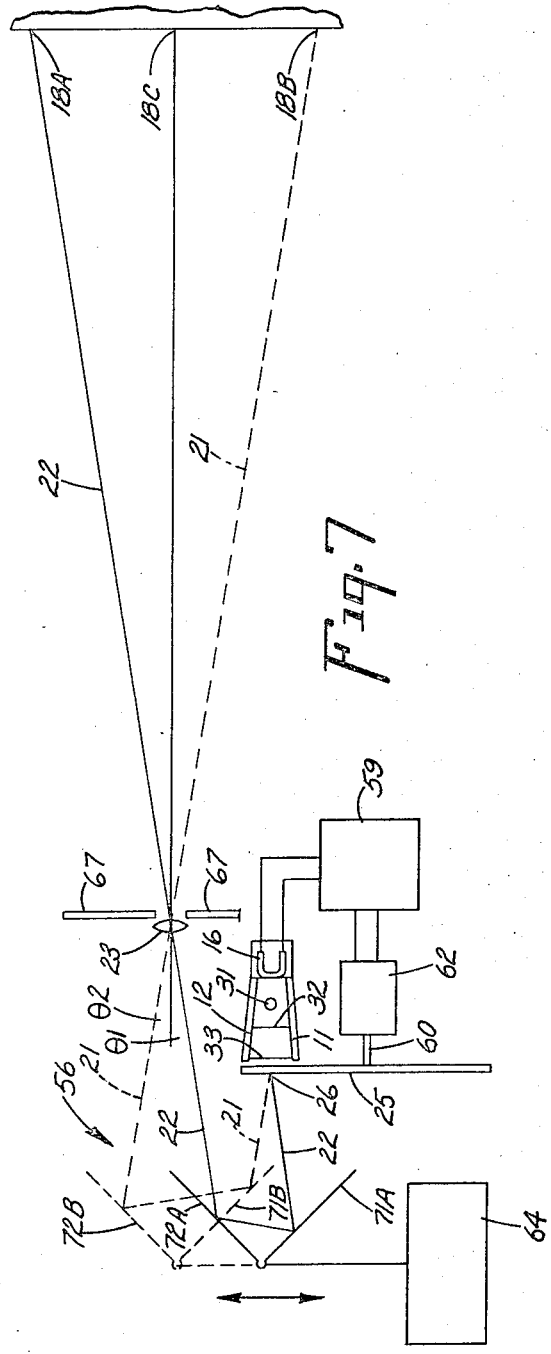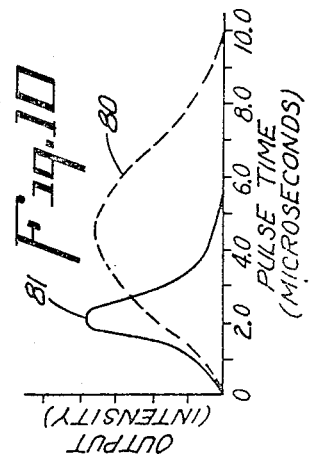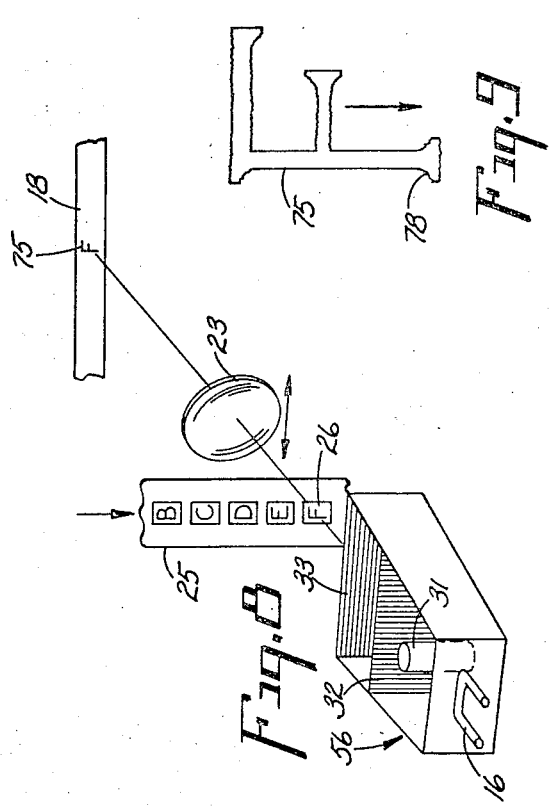

OPTICAL REFLECTOR SYSTEM

BACKGROUND OF THE INVENTION

This invention relates to optical systems and more particularly to optical reflector systems.

A review of the prior art will disclose a multitude of patents relating to optical reflector systems. These prior art reflector systems can be divided into two classes. The first class includes reflector systems having curved surfaces. Reflector systems having the shape of the various conical sections are examples of this first class of reflector systems. The second class of reflector systems is composed of reflectors having a plurality of flat reflecting surfaces arranged around a light source to project light in a given direction. Flat reflecting surfaces formed in the shape of a straight tunnel are included in this second class.

The recent trend in the manufacturing of industrial equipment is toward miniaturization. The first class of reflector systems being composed of curved surfaces were in general large and bulky and were not applicable to the miniaturized industrial equipment. Manufacturers more recently have adapted the flat surface reflector systems. A majority of these systems were in the form of an optical tunnel having parallel flat reflecting surfaces with light entering one end and propagating from the opposite end of the tunnel. These systems were easier to manufacture and less expensive than the curved surface systems. However, the tunnels lack a balanced combination of diffused and directed light to produce a uniform intensity on an optical surface spaced from the tunnel. Finally, the prior art tunnel systems did not have the ability to compensate for the effects of other optical components within an optical projection system incorporating the tunnel.

Therefore, an object of this invention is to produce an optical reflector system which is compact.

Another object of this invention is to produce an optical reflector system which can be produced at a minimum of cost.

Another object of this invention is to produce an optical reflector system which has the proper combination of diffused and directed light.

Another object of this invention is to produce an optical reflector system which is able to compensate for the effects of other optical components within an optical projection system.

Another object of this invention is to produce an optical reflector system which can be adapted to a given application.

Another object of this invention an optical reflector system which is reproduceable and interchangeable with similar reflector systems.

Another object of this invention is to produce an optical reflector system in which no adjustment is necessary when placed within machines during a manufacturing process.

Another object of this invention is to produce an optical reflector system which projects a substantially uniform intensity beam within the projected angle.

SUMMARY OF THE INVENTION

The invention may be incorporated in an optical reflector system, comprising in combination, a first and a second reflecting surface forming two sides of a tunnel, said tunnel having a first and a second aperture at the ends of said tunnel, means mounting said tunnel to allow light to enter said first aperture and reflect from said reflecting surfaces and to project from said second aperture to an optical surface spaced from said tunnel, and means establishing said reflecting surfaces in a diverging relationship from one of said apertures to reinforce the light intensity at the extremities of said optical surface.

Other objects and a fuller understanding of the invention may be had by referring to the following description and claims, taken in conjunction with the accompanying drawing.

BRIEF DESCRIPTION OF THE DRAWING

FIG. 7 shows the invention incorporated into an optical projection system;

FIG. 8 is a modification of the optical projection system shown in FIG. 7;

FIG. 9 represents a character projected by the projection systems shown in FIG. 8 and illustrates the deficiencies of the prior art systems which are overcome by the present invention; and FIG. 10 is a graph showing the intensity versus time of the light source used in FIGS. 7 and 8.

DESCRIPTION OF THE PREFERRED EMBODIMENT

Figure 1:
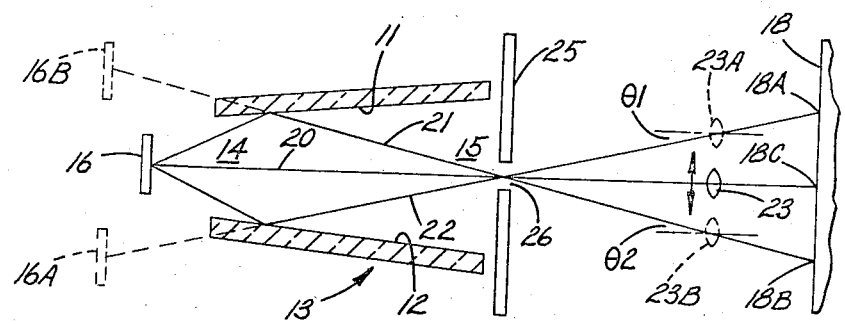
FIG. 1 shows a top view of an optical reflector system incorporating the present invention.

FIG. 1 shows an optical reflector system incorporating the present invention. The system has a first reflecting surface 11 and a second reflecting surface 12. In this illustration, the reflecting surfaces are discrete and substantially flat forming two sides of a tunnel 13. The tunnel has a first aperture 14 and a second aperture 15 at the opposite ends of the tunnel. The tunnel is mounted to allow light to enter the first aperture 14 from a light source 16 and to impinge on the first and second reflecting surfaces 11 and 12. The reflections from the first and second reflecting surfaces 11 and 12 project from the second aperture 15 to an optical surface 18 spaced from the tunnel. This optical surface can either be a real surface or an imaginary optical surface or plane used to aid the explanation. FIG. 1 shows the first and second reflecting surfaces 11 and 12 in a diverging relationship from one of the apertures. In this case, the reflecting surfaces 11 and 12 are diverging from the first aperture 14. The diverging relationship creates the virtual image light sources 16A and 16B to reinforce the light intensity at the extremities 18A and 18B of the optical surface 18.

The drawing in FIG. 1 shows a matrix 25 located in proximity to the second aperture 15. The matrix 25 has a matrix window 26 which allows the reflected rays from the reflecting surfaces 11 and 12 to project to the optical surface 18. Since the matrix window 26 is a small aperture compared to the second aperture 15, the diagram of the rays impinging upon the optical surface 18 is greatly simplified. A ray 20 is coincident with the optical axis of the optical reflector system and impinges on the optical surface 18 at 18C. The reflected rays 21 and 22 propagating from the virtual image light sources 16B AND 16A, respectively, project to the extremities 18B and 18A of the optical surface 18. In the absence of the reflecting surfaces 11 and 12, the virtual image light sources 16A and 16B would be absent and the light intensity at the extremities 18A and 18B would be essentially zero. Thus, the presence of the first and second reflecting surfaces 11 and 12 has created the virtual image light sources 16A and 16B which reinforce the intensity at the extremities of the optical surface 18. The light intensity on the optical surface 18 is not uniform. This non-uniformity is caused by the fact that the rays 21 and 22 are less intense than the ray 20. The rays 21 and 22 undergo a reflection from the reflecting surfaces 11 and 12 and travel a longer distance before reaching the optical surface 18 than the ray 20. The brightest light intensity on the optical surface 18 will occur at point 18C. Although the intensity at the extremities 18A and 18B of the optical surface 18 is not as great as in the center 18C, the intensity is substantially greater than it would be if the first and second reflecting surfaces 11 and 12 were not present. If the matrix 25 were removed, the angle of projection upon the optical surface 18 would be increased and the ray pattern would become more complex. However, the phenomena of the virtual light sources reinforcing the extremities of optical surface 18 would still be present. The angle of divergence, dihedral angle, of the first and second reflecting surfaces determines the number and position of virtual light sources. As the reflecting surfaces 11 and 12 are extended, the reflected rays undergo multiple reflections creating additional virtual image light sources.

Figure 2:
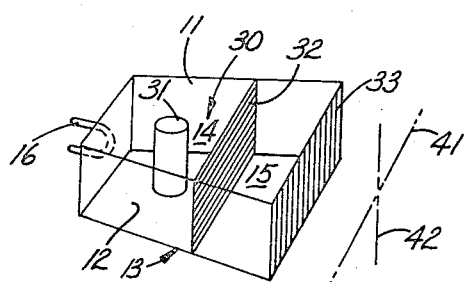
FIG. 2 is an isometric view of the preferred embodiment of the present invention.

FIG. 2 is the preferred embodiment of the present invention. FIG. 2 shows the first and a second reflecting surface 11 and 12, forming two sides of a diverging tunnel 13. The tunnel diverges from the first aperture 14 toward the second aperture 15 at the opposite end of the tunnel. The light source 16 is located at the first aperture to allow light to enter and to reflect from the surfaces 11 and 12. The reflected light from the reflecting surfaces project from the second aperture 15 to an optical surface, not shown. Virtual images are formed by the diverging reflecting surfaces 11 and 12 in a manner similar to FIG. 1.

The illustration in FIG. 2 shows a first reference plane 41 and a second reference plane 42. These reference planes are mutually perpendicular to one another. The reflecting surfaces 11 and 12 are each substantially perpendicular to the first reference plane 41 and are each facing the second reference plane 42. The reference planes are shown as finite planes for the sake of simplicity, but each reference plane extends through the optical reflector system. The light source 16 has a length greater than its width. This type of light source could be either a filament of an incandescent bulb or an electric arc, e.g. The length of the light source 16 shown in FIG. 2 is mounted in the first reference plane 41.

The optical reflector system in FIG. 2 illustrates diffuser means shown generally as 30. The diffuser means diffuses light from the light source 16 to produce a substantially uniform intensity on an optical surface spaced from the reflector system. FIG. 2 also can be considered to be composed of a plurality of diffuser means having a first diffuser means 31, a second diffuser meand 32, and a third diffuser means 33. The first diffuser means 31 is in proximity to the first aperture 14 and diffuses light in a direction substantially parallel to the first reference plane 41. The first diffuser means is located in a strategic position to diffuse the unreflected light propagating from the light source 16. The first diffuser means also diffuses some reflected light from one of the reflecting surfaces but the majority of the light diffused by the first diffuser means 31 is the direct radiation from light source 16. The second diffuser means 32 is located within the tunnel and diffuses light in a direction substantially parallel to the second reference plane 42, and the third diffuser means 33 is in proximity to the second aperture 15 and diffuses light in the direction substantially parallel to the first reference plane 41. The first diffuser means 31 reduces the intensity of the direct rays passing from the light source 16 to the optical surface as illustrated by ray 20 in FIG. 1. The second and third diffuser means work in combination with the first diffuser means to produce a substantially uniform intensity on an optical surface spaced from the tunnel.

Figure 3:
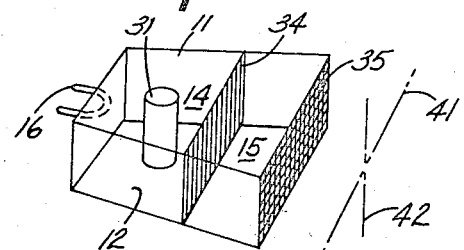
FIG. 3 is an isometric view of a variation of the present invention.

FIG. 3 shows a modification of the preferred embodiment shown in FIG. 2. FIG 3 illustrates a first and a second reflecting surface 11 and 12, a first and second aperture 14 and 15 of the tunnel and first and second mutually perpendicular reference planes 41 and 42. The reflecting surfaces 11 and 12 are substantially perpendicular to the first reference plane 41 and are each facing the second reference plane 42. The light source 16 has a length and a width in which the length thereof is mounted in the second reference plane 42. The illustration in FIG. 3 also shows a first diffuser means 31, a second diffuser means 34 and a third diffuser means 35. The first diffuser means 31 is located in proximity to the first aperture 14 and diffuses unreflected light from the light source 16 in a direction substantially parallel to the first reference plane 41. This diffuser reduces the intensity of the unreflected beam to a level commensurate with the intensity of the reflected beams as shown in FIG. 1. The second diffuser means 34 is located within the tunnel and diffuses light in a direction substantially parallel to the first reference plane 41. The third diffuser means 35 is located in proximity to the second aperture 15 and diffuses light in a direction substantially parallel to both the first and second reference planes 41 and 42. Although the orientation of the light sources and second and third diffuser means in the tunnels shown in FIGS. 2 and 3 are different, each tunnel produces a substantially uniform light intensity on an optical surface spaced from the tunnels.

Figure 4:
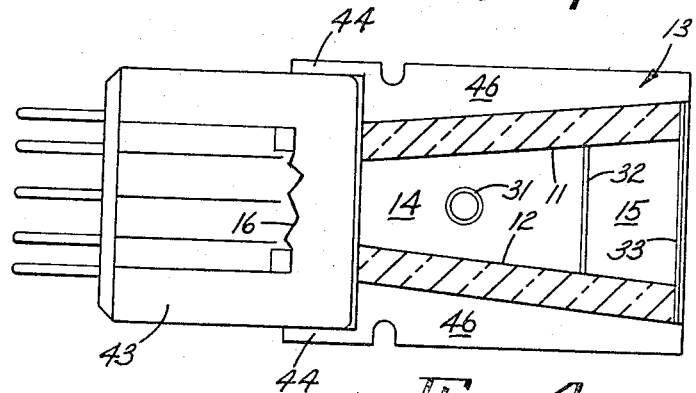
FIG. 4 is a top view of the preferred embodiment shown in FIG. 2.

FIG. 4 illustrates the top view of the preferred embodiment shown in FIG. 2. The optical reflector system has a first reflecting surface 11 and a second reflecting surface 12 forming two sides of the tunnel 13. The tunnel has a first aperture 14 and a second aperture 15. The tunnel 13 may be formed from two interfitting bases of cast metal, for example. The tunnel has a recess 44 to receive a gas flash lamp 43, the arc of which is the light source 16. The recess 44 may be considered as a means mounting the tunnel to allow light from the light source 16 to enter the first aperture 14 and reflect from the first and second reflecting surfaces 11 and 12. The reflected light from the reflecting surfaces project from the second aperture 15 to an optical surface spaced from the tunnel which is not shown. The tunnel bases have lengthwise grooves 46 to receive and hold the front surface mirrors as first and second reflecting surfaces 11 and 12. The grooves 46 are thus a means establishing the surfaces 11 and 12 in a diverging relationship from the first aperture 14 to reinforce the intensity at the extremities of the optical surface. The illustration in FIG. 4 also contains the first, second and third diffuser means 31, 32 and 33, which were previously described in the description of FIG. 2. The light source 16 is shown as an electric arc such as an electric arc in a Xenon flash tube.

The dihedral angle formed by the reflecting surfaces and the placement of the first, second and third diffuser means 31, 32 and 33 determine the distribution of the light intensity projected upon the optical surface. In the illustration shown in FIG. 4, the dihedral angle between the reflecting surfaces is approximately 11°.

Figure 5:
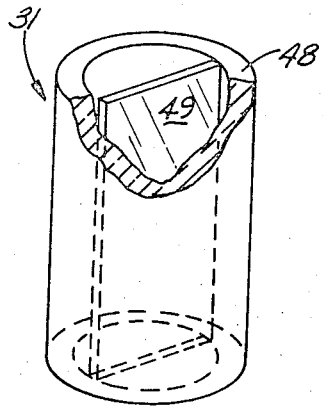
FIG. 5 is a diagram of a first diffuser means used in the invention shown in FIGS. 2, 3, 4, 7 and 8.

FIG. 5 represents an example of a diffuser means 31 which can be used for the first diffuser means mentioned in FIGS. 2–4. The diffuser means is composed of a transparent cylindrical tubing diffuser 48. The axis of the first diffuser 48 is mounted in the second reference plane 42 of FIGS. 2 and 3. The diffuser diffuses light in a direction substantially perpendicular to the axis of the cylinder. Since the first diffuser is hollow, an optional neutral density filter shown as 49 can be inserted within the first diffuser 48 to reduce the intensity of the unreflected beams propagating from the light source.

Figure 6:
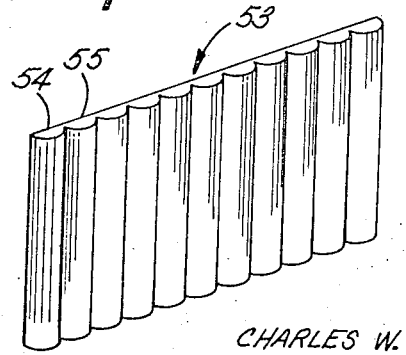
FIG. 6 is a lenticular screen means which is used in the invention shown in FIGS. 2, 3, 4, 7 and 8.

FIG. 6 illustrates a lenticular diffuser 53 which is suitable for use as the second diffuser means 32, 34 and the third diffuser means 33 of FIGS. 2–4. The diffuser is composed of a transparent material formed in a series of closely spaced adjacent half cylinders. The axes 54, 55 etc. of each of the half cylinders are parallel and lie in the flat back surface of the diffuser. Parallel light entering the flat back surface of the diffuser is diffused in a direction substantially perpendicular to the axes of the half cylinders. Each half cylinder of the diffuser means acts as an individual light source to provide the optical reflector system with the proper balance of directed and diffused light to enable a substantially uniform intensity to be projected upon an optical surface spaced from the reflector system. The third diffuser means 35 of FIG. 3 is composed of two diffuser means as shown in FIG. 6 having the axes of one diffuser means perpendicular to the axes of the other diffuser means. An alternative arrangement is a single diffuser means having half cylinders scribed in two perpendicular directions.

The optical reflector system described in FIGS. 1–6 can be used in an optical projection system. One such application, shown in FIG. 1, illustrates a rudimentary photo-composition or photo-type setting apparatus. The optical reflector system which comprises a portion of the optical projection system has already been described. The projection system operates when a matrix character appears in the matrix window 26. This matrix character will be projected within the included angle from the matrix window to the extremities of 18A, 18B of the optical surface 18. The optical surface would normally be a photo-sensitive material sensitive to the projected character from the matrix window 26. A movable lens 23 focuses the projected character from the matrix window to the optical surface 18. A mask (not shown) is located about the perimeter of the lens 23 to block extraneous light from reaching the optical surface 18. Only light passing through the lens 23 will impinge upon the optical surface 18. The movement of the lens 23 in a linear direction as shown by the arrows enables a character located in the matrix window 26 to be projected at any point along the optical surface 18. When the lens 23 is in one of the extreme directions of scan shown as positions 23A and 23B, a central beam from the matrix window does not pass through the lens parallel to the optical axis of the lens. This non-parallel incident ray causes a decrease in the light transmittance of the lens 23 in relationship to the fourth power of the cosine of the angle between the axis of the lens and the incident rays from the matrix window. This angle is designaged $\theta 1$ and $\theta 2$ in FIG. 1.

The optical reflector system disclosed in this invention is able to compensate for this fourth power decrease in light transmittance of lens 23. The first diffuser means 31 shown in FIGS. 2–5 diffuses and reduces the intensity of the central beam shown as 20 in FIG. 1. In addition, the first and second reflecting surfaces 11 and 12 in FIG. 1 reinforce the light intensity of the extremities 18A, 18B of the optical surface 18. With the proper selection of the first diffuser means, and the dihedral angle between the first and second reflecting surfaces 11 and 12, the decrease in the light transmittance of the lens 23 in positions 23A and 23B can be compensated producing a uniform intensity throughout the projected angle of scan on the optical surface 18. A uniform intensity on an optical surface such as a photo-sensitive surface for photo-type setting or photo-composition is essential for proper image quality.

FIG. 7 shows an optical projection system incorporating the optical reflector system in accordance with this invention. The optical reflector system shown generally as 56 has a first and second reflecting surface 11 and 12 diverging from a light source 16. The reflector system 56 has a first diffuser 31, a second diffuser 32 and a third diffuser 33 as described in FIG. 2.

The light source 16 is of the type capable of producing a short duration pulse of light on the order of several microseconds. The power source 59 furnishes power and triggers the light pulse. The optical projection system has a matrix 25 which rotates about a shaft 60 driven by a motor 62. The matrix is opaque with the exception of matrix windows 26 in which the characters are located. As the matrix wheel rotates, the characters to be projected rotate sequentially. A light beam projecting from the matrix window 26 strikes a system of two mirrors 71A and 72A which are movable by a scanner 64 along a line indicated by the arrows. When the mirror pair is in the 71A and 72A position, a beam 22 propagating from the matrix window 26 will pass through the lens 23 to the extremity 18A of the optical surface 18. This beam enters the lens 23 non-parallel to the axis of lens forming an angle $\theta 1$. When the scanner 64 moves the mirror pair into the 71B and 72B position, a beam 21 propagating from the matrix window 26 passes through the lens 23 to the other extremity 18B of the optical surface 18. This beam enters the lens 23 at an angle $\theta2$ with respect to the optical axis of the lens 23. The movement of the mirror pair by the scanner means 64 determines the position of the projection of the character in the matrix window 26. A mask 67 with an aperture for the lens ensures that only the beams passing through the lens 23 will reach the optical surface 18. The synchronization between the rotation of the matrix 25 and the pulse of light by the light source 16 determines the character projected. With the proper dihedral angle between the reflecting surfaces 11 and 12, and the proper first diffuser means 31, the optical reflector system 56 compensates for the decrease in transmittance of the lens 23 at the extremities 18A and 18B of the scan to project a uniform intensity character irrespective of the position along the optical surface 18.

FIG. 8 shows another view of an optical projection system similar to the type shown in FIG. 1. An optical reflector system 56 identical to the type shown in FIGS. 2, 4, 7 is mounted to a light source 16 which projects light through a matrix window 26 and a lens 23 to an optical surface 18. The matrix 25 is moving along a line shown by the arrow. The lens 23 is movable along a line determined by the double headed arrow to scan along the optical surface 18.

Since the matrix 25 is rapidly moving, the pulse time of the light source 16 must be short enough to stroboscopically "stop", the matrix window 26 so that the projected image 75 will not be blurred. FIG. 9 shows an example of the projected image 75 when the pulse length of the light source 16 is too long compared to the speed of the matrix 25. The image is blurred in the direction of the movement of the matrix 25. If the letters have serifs 78, these especially can be blurred by the rapid movement of the matrix.

The prior art systems which have tried to use a short duration flash tube to scan a line field such as that of the optical surface 18, have been unable to produce a uniform intensity along the line field. The prior art systems that have been able to obtain a uniform intensity along the line field did this at the expense of increasing the arc length of the light source. The duration of the pulse in a flash tube is proportional to the arc length. Therefore, by tripling the arc length of the flash tube, a uniform intensity was achieved across the line field but the flash was unable to stroboscopically "stop" the matrix character. The end result was a blurred character as shown in FIG. 9. Some prior art systems use a plurality of flash tubes to effectively extend the arc length without increasing the arc duration. FIG. 1 shows by a curve 80 that the pulse time of the prior art is long relative to the present invention which short pulse time is shown in curve 81, yet each system has the same effective arc length.

FIGS. 7 and 8 illustrate a method of projecting characters from the matrix 25 by the light source 16 and the lens 23 upon different positions of the optical surface 18 with substantially uniform intensity. The method of projection contains four steps. The first step includes moving the matrix 25 to index the characters contained on the matrix. Moving the matrix includes rotating the matrix wheel as shown in FIG. 7 or linearly moving the matrix as shown in FIG. 8.

The second step in the method of projecting characters is pulsing the light source 16 in synchronization with the matrix to stroboscopically project a selected character through the lens 23 to the optical surface 18. Pulsing the light includes igniting a flash tube such as a Xenon flash tube. Concomitantly, pulsing the light includes directing light and reflecting light from the reflecting surfaces 11 and 12 from the light source 16 to the matrix 25. The method shown in FIGS. 7 and 8 also includes attenuating the directed light from the light source 16 by means of the first diffuser means 31. The method also illustrates diffusing light propagating from the light source 16 to the matrix 25 by the second and third diffuser means 32 and 33.

FIGS. 7 and 8 illustrate the third step of varying the position of the projected character on the optical surface 18. This variation produces a variation in the angle formed between the projected beam and the optical axis of the lens 23. In FIG. 7, varying the position of the projected character is accomplished by moving the reflecting surfaces 71A, 72A located between the matrix 25 and the optical surface 18. FIG. 8 illustrates that the varying of the position of the projected character can be accomplished by moving the lens 23.

The fourth step in the method of projecting characters is reinforcing the light which is projected through the matrix to compensate for the variation in light transmittance of the lens 23 produced by the variation in the angle between the projected beam and the optical axis of the lens 23. Reinforcing the light includes reflecting light from the light source 16 which results in creating virtual images to extend the effective length of the light source 16. The method of reflecting light from the optical reflector system 56 includes reflecting light at an angle relative to the optical axis 20 shown in FIG. 1 which angle is different from the angle of the incident light relative to the optical axis 20. This phenomena results from the fact that the first and second reflecting surfaces 11 and 12 are diverging from one of the apertures 14 and 15.

In a system actually constructed by the inventor, the optical reflector system contained first surface glass reflecting surfaces which were approximately an inch long and one-half inch wide. The reflecting surfaces had a dihedral angle of approximately 11° and was able to compensate for a lens system and produce a uniform intensity on an optical surface within a projected angle of approximately 20°. The light source was a Xenon flash tube having an arc length of five-sixteenths of an inch which was effectively increased to a one inch arc. The duration of the Xenon pulse still remained at approximately two microseconds and was able to stroboscopically stop a rotating matrix wheel as shown in FIG. 7. The variation in intensity on the optical surface between the extremities was less than 5 percent and well within the requirements for the photo-type setting and photo-composition arts. The system was compact and was able to be produced at a minimum cost. The reflector system was able to be placed within machines during the manufacturing process without special adjustments, and not requiring any specially trained personnel.

Although the optical reflector system can be adjusted to compensate for other optical components, the system can also be used to produce a desired distribution in light intensity on the optical screen. If an application required an increase in intensity at the extremities of the optical surface, this could be accomplished by the disclosed invention. Similarly, the light source used in conjunction with the optical reflector system is not limited to a light source having a length and a width but could also be used with a point light source.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An optical reflector system comprising, in combination,
   a first and a second reflecting surface forming two sides of a tunnel,
   said reflecting surfaces are each substantially perpendicular to a first reference plane and are each facing a second reference plane where said reference planes are mutually perpendicular,
   said tunnel having a first and a second aperture at the ends of said tunnel,
   means mounting said tunnel to allow light to enter said first aperture and reflect from said reflecting surfaces and to project from said second aperture to an optical surface spaced from said tunnel,
   means establishing said reflecting surfaces in a diverging relationship from one of said apertures to reinforce the light intensity at the extremities of said optical surface,
   and a plurality of diffuser means to diffuse light in directions substantially parallel to said reference planes producing a substantially uniform intensity on said optical surface.

2. An optical reflector system as set forth in claim 1, wherein said plurality of diffuser means includes a first, second, and third diffuser means,
   said first diffuser means being in proximity to said first aperture to diffuse unreflected light in a direction substantially parallel to said first reference plane,
   a second diffuser means being within said tunnel to diffuse light in a direction substantially parallel to one of said reference planes,
   and said third diffuser means being in proximity to said second aperture to diffuse light in a direction substantially parallel to the other of said reference planes.

3. An optical reflector system as set forth in claim 2, wherein said one of said reference planes is said second reference plane.

4. An optical reflector system as set forth in claim 2, wherein said third diffuser means diffuses light in a direction substantially parallel to said first and second reference planes.

5. An optical reflector system as set forth in claim 2, wherein said second and third diffuser means includes lenticular screen means.

6. An optical reflector system as set forth in claim 2, wherein said first diffuser means includes a first diffuser and filter means.

7. An optical reflector system as set forth in claim 6, wherein said first diffuser includes transparent tube means.

8. An optical projection system, comprising in combination,
   a light source,
   an image surface,
   a plurality of reflecting surfaces,
   means mounting said surfaces diverging from said light source to project light from said light source to said image surface,
   means establishing an object between said light source and said image surface to project an image of said object on said image surface,
   means varying the relative position of said image and said image surface along a first path,
   and said light source and said reflecting surfaces being fixed relative to said image surface along said first path.

9. An optical projection system as set forth in claim 8, wherein said reflecting surfaces are substantially flat.

10. An optical projection system as set forth in claim 8, including diffuser means between said light source and said image surface resulting in said image being substantially uniform in intensity regardless of the position of said image on said image surface.

11. An optical projection system as set forth in claim 8, wherein said relative position varying means includes scanning means.

12. An optical projection system as set forth in claim 8, wherein said image surface is a substantially linear field having a long length relative to the width thereof.

13. An optical projection system as set forth in claim 8, wherein said light source includes a short duration electric arc,
   said duration of said electric arc being substantially proportional to the arc length thereof,
   said means establishing an object includes a rapidly high moving character matrix means wherein a given character is stroboscopically projected on said image surface,
   and said means mounting said surfaces produces a plurality of virtual image sources which optically increase said arc length to produce increased light output without an increase in arc duration.

14. The method of projecting characters from a matrix by a light source and a lens upon different positions of an optical surface with substantially uniform intensity comprising the following steps;
   moving the matrix to index the characters thereof,
   pulsing the light source in synchronization with the matrix to stroboscopically project a selected character through the lens to the optical surface,
   varying the position of the projected character on the optical surface producing a variation in an angle formed between the projected beam and the optical axis of the lens,
   and reinforcing the light to compensate for the variation in light transmittance of the lens produced by the variation of the angle between the projected beam and the optical axis of the lens.

15. The method as set forth in claim 14, wherein moving the matrix includes rotating a matrix wheel.

16. The method as set forth in claim 14, wherein pulsing the light includes igniting a flash tube.

17. The method as set forth in claim 14, wherein pulsing the light includes directing light and reflecting light from the light source to the matrix.

18. The method as set forth in claim 17, including attenuating the directed light.

19. The method as set forth in claim 14, including diffusing light propagating from the light source to the matrix.

20. The method as set forth in claim 14, wherein varying the position includes moving a reflecting surface between the matrix and the optical surface.

21. The method as set forth in claim 14, wherein reinforcing the light is by light from the light source.

22. The method as set forth in claim 14, wherein reinforcing the light includes creating virtual images of the light source to extend the effective length of the light source.

23. The method as set forth in claim 14, wherein reinforcing the light includes reflecting light from the light source.

24. The method as set forth in claim 14, wherein reinforcing the light includes reflecting light at an angle relative to an optical axis which angle is different from the angle of the incident light relative to the optical axis and wherein the optical axis intersects the light source and the matrix.

25. An optical reflector system comprising, in combination, a first and a second reflecting surface forming two sides of a tunnel, said tunnel having a first and a second aperture at the ends of said tunnel, means mounting said tunnel to allow light to enter said first aperture and reflect from said reflecting surfaces and to project from said second aperture to an optical surface spaced from said tunnel, lens means between said tunnel and said optical surface, means establishing said reflecting surfaces in a diverging relationship from one of said apertures to reinforce the light intensity at the extremities of said optical surface;

to compensate for the falloff of said lens means due to light entering non-parallel to the optical axis of said lens means, and diffuser means between said tunnel and said lens means producing a substantially uniform intensity on intensity on said optical surface.

* * * * *